Nov. 3, 1970 — J. E. CAVENEY — 3,537,146
INTEGRAL ONE-PIECE CABLE TIE
Filed Aug. 6, 1968 — 2 Sheets-Sheet 1
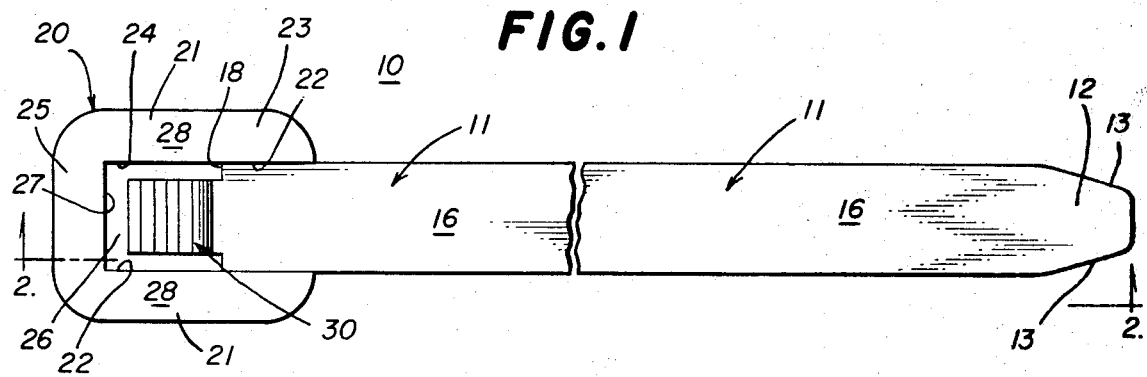
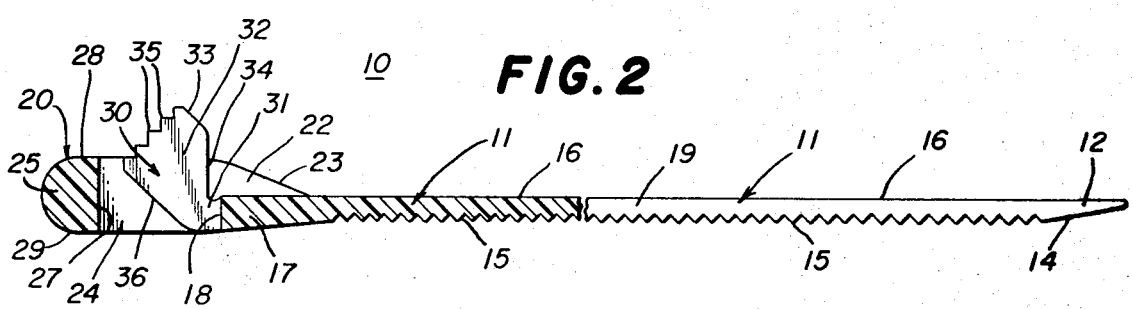
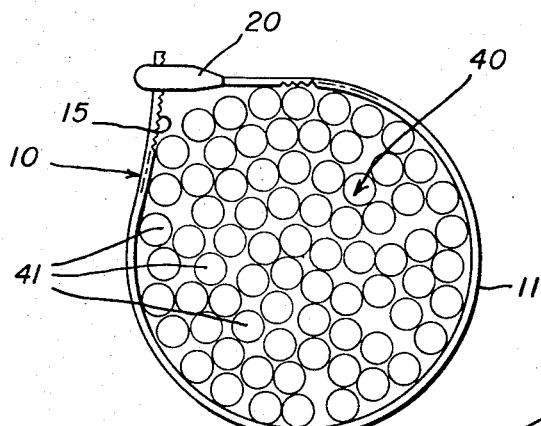
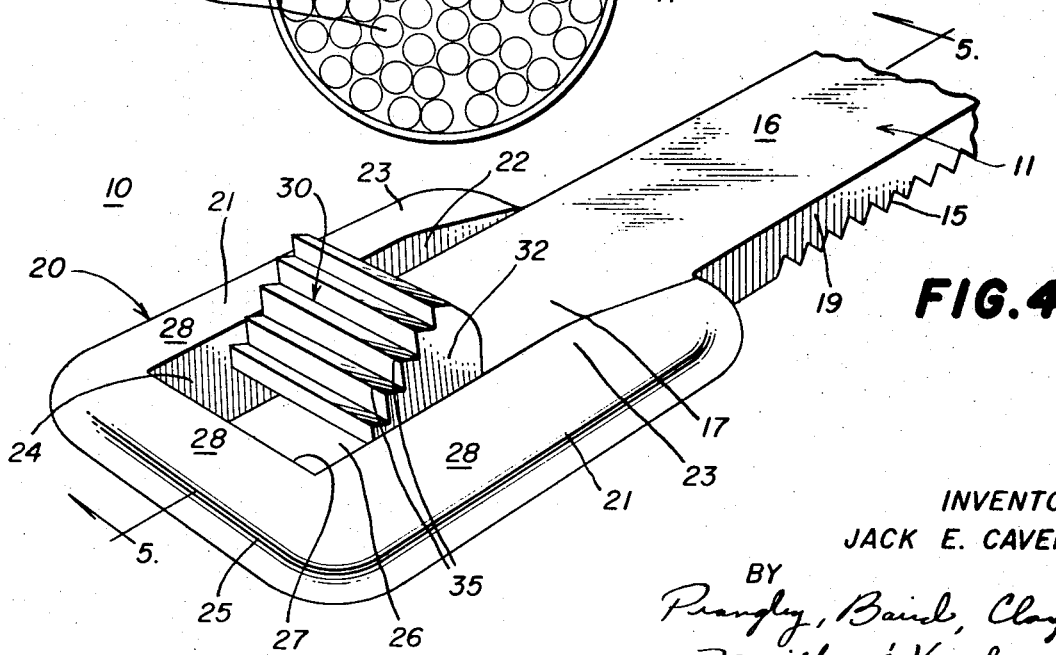
INVENTOR
JACK E. CAVENEY United States Patent Office 3,537,146
Patented Nov. 3, 1970

3,537,146
INTEGRAL ONE-PIECE CABLE TIE
Jack E. Caveney, Chicago, Ill., assignor to Panduit Corp., Tinley Park, Ill., a corporation of Delaware
Filed Aug. 6, 1968, Ser. No. 750,570
Int. Cl. B65d 63/00
U.S. Cl. 24—16                                                27 Claims

ABSTRACT OF THE DISCLOSURE

There is disclosed an integral one-piece cable tie to be tensioned about a bundle of wires, the cable tie including an elongated flexible strap having a frame integral with one end thereof, the frame having a pair of longitudinally extending side walls and an end wall and having a strap-receiving opening therethrough, a row of teeth on one surface of the strap, a pawl hingedly mounted on the frame and extending into the strap-receiving opening, the end wall having a strap-bearing surface disposed toward the pawl and the pawl having a strap-engaging surface disposed toward the end wall, and a set of teeth disposed on the strap-engaging surface and shaped complementary to the row of teeth on the strap.

---

The present invention is directed to cable ties for binding a bundle of wires and the like, and specifically to an integral one-piece cable tie.

It is an important object of the present invention to provide an integral one-piece cable tie to be tensioned about a bundle of wires and the like, the cable tie including an elongated flexible strap, a frame integral with one end of the strap, the frame including a pair of longitudinally extending and spaced-apart side walls and an end wall joining the outer ends of the side walls and having a strap-receiving opening therethrough, a row of teeth disposed on one longitudinal surface of the strap and arranged transversely with respect thereto, a pawl hingedly mounted on and integral with the frame and extending into the strap-receiving opening toward the end wall, the end wall having a strap-bearing surface disposed toward the pawl and the pawl having a strap-engaging surface disposed toward the end wall and defining therewith a strap-receiving channel, and a set of teeth disposed on the strap-engaging surface of the pawl and arranged transversely with respect thereto and shaped complementary to the row of teeth on the strap, the strap being deformable into a loop encircling a bundle of wires with the other end of the strap etxending into the strap-receiving channel and through the opening in the frame and therebeyond, the set of teeth being disposed toward the row of teeth and at least one of said set of teeth being sequentially engageable with successive ones of said row of teeth as the strap is tightened about the bundle of wires to a tensioning condition, any force tending to withdraw the strap from within the strap-receiving channel in a strap-loosening direction serving to move the set of teeth into more firm engagement with the engaged ones of the row of teeth firmly to wedge the strap between the strap-bearing surface and the strap-engaging surface, whereby to prevent inadvertent withdrawal of the strap from the frame and thus to lock the strap in its tensioned condition about the bundle of wires.

In connection with the foregoing object, another object of the invention is to provide an improved cable tie of the type set forth wherein the frame has a thickness substantially greater than that of the strap with one surface of the strap and the adjacent surface of the frame being in substantial alignment, whereby the frame extends upwardly well beyond the other surface of the strap.

Another object of the invention is to provide a one-piece cable tie of the type set forth wherein there is an area of reduced thickness provided between the frame and the pawl to define a hinge area therebetween, the pawl as molded extending well beyond the surface of the frame disposed opposite the row of teeth.

Another object of the invention is to provide an integral one-piece cable tie of the type set forth wherein the pawl has the surface thereon disposed away from the row of teeth substantially flush with the adjacent surface of the frame when the set of teeth are in locking engagement with the associated ones of the row of teeth, i.e., no part of the pawl extends beyond the exit side of the frame.

Another object of the invention is to provide an improved cable tie of the type set forth wherein a plurality of the teeth on the pawl are disposed opposite the strap-engaging surface of the frame with the strap-engaging surface extending beyond at least two of the engaged pawl teeth, whereby the engaged pawl teeth are encompassed thereby.

Another object of the invention is to provide an improved cable tie of the type set forth wherein the planes defined by the surfaces of the pawl teeth disposed toward the entry surface of the frame in the tensioned condition converge with the plane of the surfaces of the pawl disposed toward the exit surface of the frame at points disposed on the exit side of the frame and at angles as small as zero degrees, i.e., the plane could be parallel.

Another object of the invention is to provide a cable tie of the type set forth wherein all of the pawl teeth are engaged and loaded in the tensioned condition of the strap, and further wherein the crests of the pawl teeth lie in a common plane, which plane is substantially parallel to the strap-engaging surface of the frame in the tensioned condition.

A further object of the invention is to provide an improved integral one-piece cable tie of the type set forth wherein the portion of the frame disposed between the pawl and the strap has a thickness of the same order of magnitude as the strap, whereby to permit unrestricted bending movement of the pawl out of the frame.

A still further object of the invention is to provide an integral one-piece cable tie of the type set forth wherein the strap bearing surface on the frame and the strap-engaging surface on the pawl are disposed essentially in parallelism when the set of teeth is in locking engagement with the associated ones of the row of teeth, the strap-bearing surface being disposed substantially normal to the as-molded longitudinal axis of the strap.

Further features of the invention pertain to the particular arrangement of the parts of the integral one-piece cable tie, whereby the above-outlined and additional operating features thereof are attained.

The invention, both as to its organization and method of operation, together with further objects and advantages thereof, will best be understood with reference to the following specification taken in connection with the accompanying drawings, in which:

FIG. 1 is a plan view of an integral one-piece cable tie made in accordance with and embodying the principles of the present invention;

FIG. 2 is a side view with certain portions in section of the cable tie of FIG. 1 substantially as viewed in the direction of the arrows along the line 2—2 thereof;

FIG. 3 is a diagrammatic view illustrating the cable tie of FIG. 1 applied to a bundle of wires;

FIG. 4 is an enlarged fragmentary perspective view of the end of the cable tie including the head and the pawl forming a part thereof;

Figure 5:
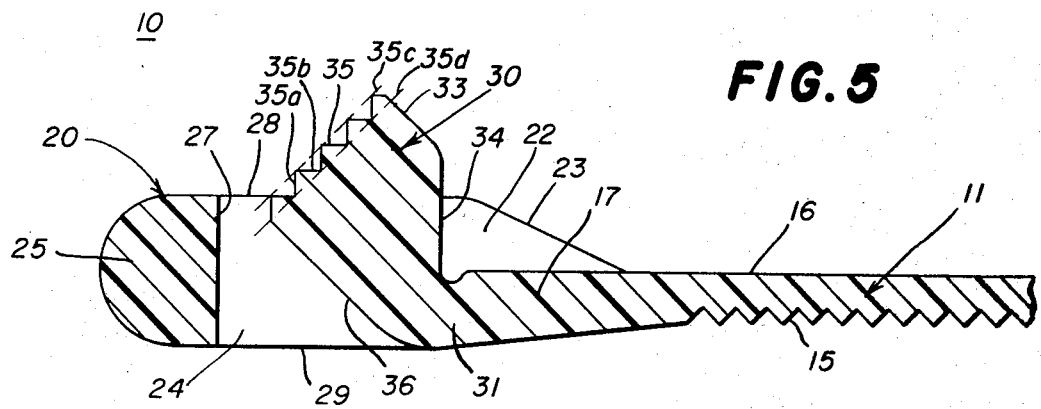
FIG. 5 is a view in vertical section along the line 5—5 of FIG. 4.

Referring to the drawings, and particularly to FIGS. 1 and 2 thereof, there is shown an integral one-piece cable tie 10 made in accordance with and embodying the principles of the present invention. The cable tie 10 includes generally a strap 11 carrying on one end thereof a frame or head 20 having a strap-receiving opening 26 therethrough in which is positioned a pawl 30. The cable tie 10 is typically used to bind a bundle 40 formed of a plurality of individual wires 41, and accordingly, the cable tie 10 has been illustrated in this end use; however, it will be appreciated that the cable tie 10 may be advantageously used to bind other objects in a like manner.

It will be appreciated that the cable tie 10 is formed of a suitable synthetic organic plastic resin, the preferred resin being one of the polyamide resins, and must be sufficiently flexible to permit deformation of the several parts thereof as illustrated throughout the drawings. It is an important feature of the present invention that each of the parts of the cable tie 10 is integral with the adjacent parts, whereby the cable tie 10 is truly one-piece and formed integral throughout.

The strap 11 is elongated and flexible and includes an outer end 12 which is provided with tapered sides 13 as well as an inclined surface 14 on the lower side thereof as viewed in FIG. 2, whereby the outer end 12 has reduced dimensions in both the transverse direction and in the thickness thereof. The underside of the strap 11 as illustrated in FIG. 2 is provided with an essentially continuous row of engagement members of teeth 15, the teeth 15 as illustrated extending from and adjacent to the outer end 12 to a point adjacent to the frame 20. The other surface 16 of the strap 11 is formed smooth and essentially flat as molded. The end of the strap 11 opposite the outer end 12 has a thickened section 17 that terminates in an end wall 18 that is disposed essentially normal to the longitudinal axis of the strap 11 as molded. The strap 11 further is provided with a pair of essentially parallel strap sides 19 that extend the length thereof, i.e., from adjacent to the outer end 12 to the thickened section 17.

The frame 20 is integral with the strap 11 and comprises the thickened section 17, a pair of side members 21 and an end member 25. The side members 21 are integral with the strap 11 at the thickened section 17 and extended from the lower suface thereof upwardly above the smooth surface 16 of the strap 11 as illustrated in FIGS. 2 and 4 to 7. More specifically, the side members 21 are respectively provided with inner surfaces 22 that are disposed essentially parallel to each other and are disposed in the same planes as the strap sides 19. The upper sides of the side members 21 are provided with upwardly inclined surfaces 23, as viewed in FIG. 2, whereby the main portion of the side members 21 have a thickness that is substantially greater than the thickness of the strap 11 and even the thickness of the thickened section 17 of the strap 11. The inner surfaces 22 merge into side walls 24 provided on the inwardly facing portions of the side members 21 adjacent to the juncture thereof with the end member 25. The end member 25 is provided with an end wall 27, spaced from the end wall 18 and disposed essentially parallel thereto. The end walls 18 and 27 are also perpendicular respectively to the side walls 24, the end walls 18 and 27 and the side walls 24 defining therebetween the strap-receiving opening 26 in the frame 20. The upper surfaces of the side members 21 and the end member 25 lie in a common plane and define a common upper or exit surface 28, and and the lower surface of the side members 21 and the end member 25 lie in a common plane and define a common lower or entry surface 29. The lower surface 29 is formed essentially as a continuation of the lower side of the strap 11 as molded and as viewed in FIG. 2, but the upper surface 28 is disposed well above the strap surface 16 since the frame 20 has a thickness substantially greater than that of the strap 11. It also will be noted that the outer edges of the frame 20 including the outer edges of the side members 21 and the end member 25 are rounded, whereby there are no sharp corners or edges on which items would be accidentally torn or cut during use of the cable tie 10.

Figure 6:
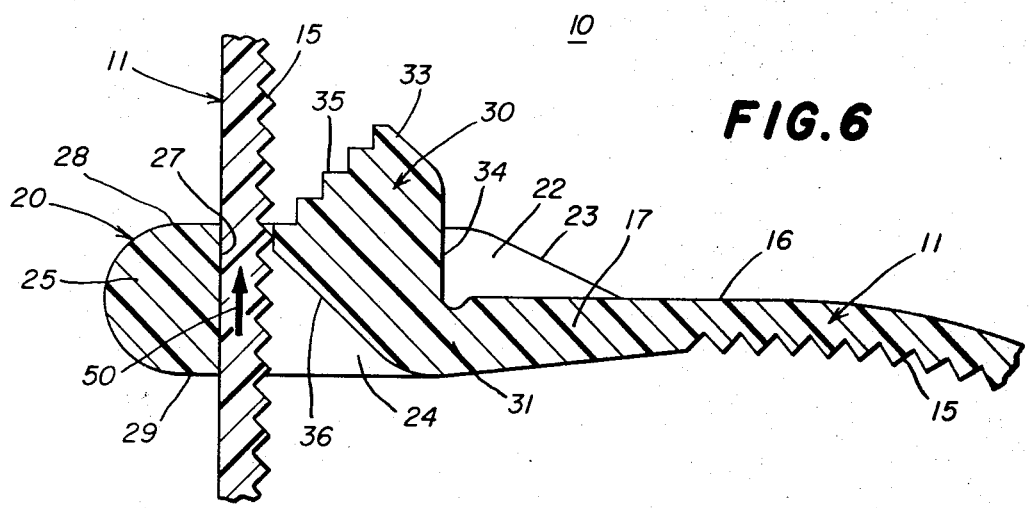
FIG. 6 is a view similar to FIG. 5 showing the parts in the positions assumed during insertion of the strap end of the cable tie through the frame and past the pawl therein.
Figure 7:
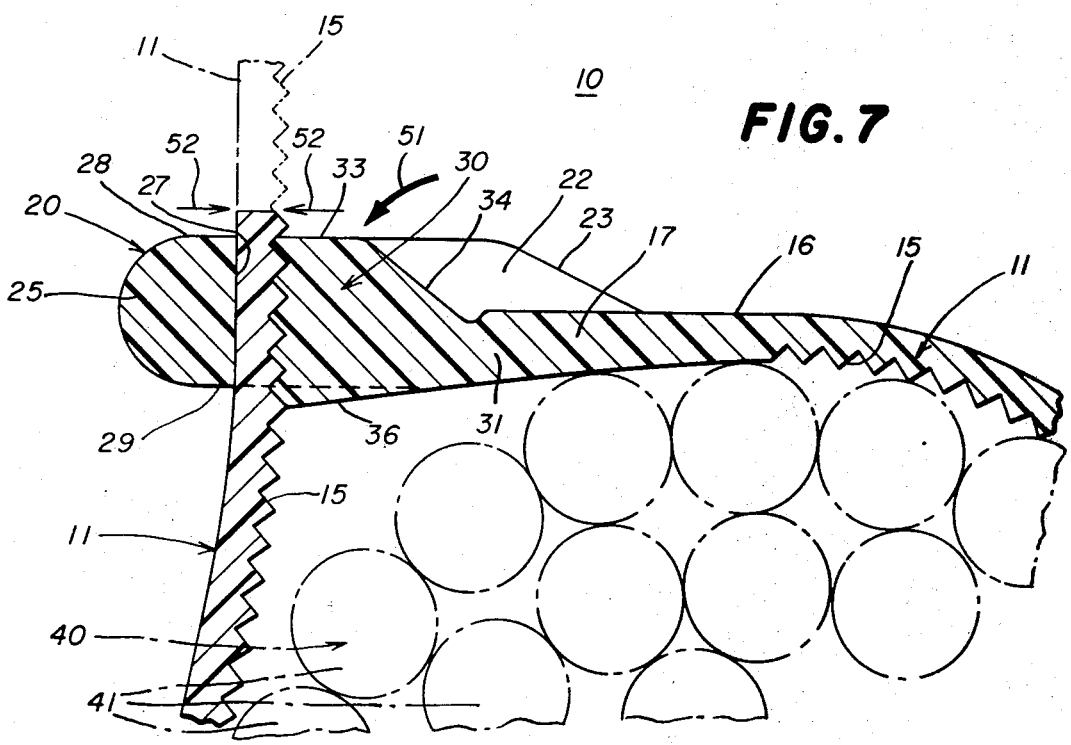
FIG. 7 is a view similar to FIG. 5 showing the parts of the cable tie in the locking positions thereof.

The pawl 30 is hingedly mounted on and integral with the frame 20, and specifically is integral with the thickened section 17. As best seen in FIGS. 5 to 7, there is a narrow neck joining the pawl 30 and the thickened section 17 to provide a hinge section 31 that is well defined, thus to facilitate hinged movement of the pawl 30 with respect to the frame 20, and specifically with respect to the thickened section 17 thereof. Referring to FIG. 1, it will be seen that the width of the pawl 30 is substantially less than the width of the strap 11 and the width of the strap-receiving opening 26; the pawl 30 is further provided with a pair of parallel side surfaces 32 that are disposed essentially normal to the end wall 18 and the end wall 27 and that are disposed essentially parallel to the side walls 24. The pawl 30 is essentially wedge shaped in side view as seen in FIG. 2 and has a top surface 33 that joins with an inclined surface 34 that joins the top surface 33 and the hinge section 31. The surface of the pawl 30 disposed toward the end wall 27 is a strap-engaging surface and carries thereon a set of teeth 35 that are shaped complementary to the row of teeth 15 formed on the strap 11, each of the teeth 35 having a first surface 35a disposed essentially vertically as illustrated in FIGS. 5 and 6 and disposed toward the lower or entry surface 29 in the tensioned condition of FIG. 7 and each of the teeth 35 having a second surface 35b disposed essentially horizontally as illustrated in FIGS. 5 and 6 and disposed toward the upper or exit surface 38 in the tensioned condition of FIG. 7; the crests of the teeth 35 lie in a common plane diagrammatically illustrated in FIG. 5 by the dashed lines 35c and the roots of the teeth 35 likewise lie in a common plane diagrammatically illustrated by the dashed line 35d in FIG. 5. The surface of the pawl 30 on which the teeth 35 are formed is disposed essentially normal to the top surface 33 and extends downwardly to a lower surface 36 which joins the teeth 35 to the hinge section 31. The end wall 27 on the end member 25 provides a strap-bearing surface, as will be described more fully hereinafter, and the end wall 27 and the wall of the pawl 30 carrying the teeth 35 define therebetween a strap-receiving channel disposed within the strap-receiving opening 26 in the frame 20.

The cable tie 10 is shown in the as-molded condition in FIGS. 1 and 2, wherein it will be seen that the strap 11 is essentially straight and the pawl 30 is biased and positioned upwardly with respect to the frame 20 and extends well above the upper surface 28 thereof with the inclined surface 34 disposed almost normal to the strap surface 16 and with the surface carrying the set of teeth 35 disposed at an angle of approximately 45° with respect to the strap surface 16 and the end wall 27.

The strap 11 is deformable into a loop for encircling the bundle 40 of the wires 41, it being noted that the row of teeth 15 is disposed inwardly and against the bundle 40, see FIG. 3. The outer end 12 is first inserted into the strap-receiving opening 26 and is guided by the lower surface 36 on the pawl 30 into the strap-receiving channel between the end wall 27 and the pawl 30. Eventually the teeth 15 will come into contact with the pawl 30 at which time it may be necessary that the pawl 30 be pivoted in a clockwise direction as viewed in FIGS. 2, 5 and 6, which pivotal movement is accommodated by the fact that there is no obstruction in the path of the inclined surface 34, i.e., the inner surfaces 22 are spaced apart a distance greater than the width of the pawl 30, whereby the pawl 30 may be freely pivoted in a clockwise direction to a substantial degree. Movement of the strap 11 through the head 20 and past the pawl 30 is in the direction of the arrow 50 in FIG. 6 during the tightening of the strap 11 about the bundle 40. Once the strap 11 extends beyond the head 20, and specifically beyond the upper surface 28 as a result of manual manipulation of the cable tie 20, that portion of the strap 11 above the surface 28 in FIG. 6 can be grasped to tighten the cable tie 10 about the bundle 40 by pulling the strap 11 in the direction of the arrow 50 in FIG. 6. After the desired degree of tension has been placed in the strap 11, that portion of the strap 11 above the frame 20 in FIG. 6 is released, whereby the resiliency in the strap 11 and the tension exerted by the bundle 40 will move the strap 11 downwardly with respect to the head 20 as viewed in FIG. 7, thereby to cause engagement between the set of teeth 35 on the pawl 30 and certain ones of the teeth 15 on the strap 11. Such movement of the strap 11 with respect to the head 20 pivots the pawl 30 in a counterclockwise direction, and in the direction of the arrow 51 in FIG. 7, so as to place the parts in the position of FIG. 7. With the parts in the positions illustrated in FIG. 7, the pawl 30 clamps the strap 11 against the end wall 27, thus firmly to hold the strap 11 and to prevent further movement thereof downwardly with respect to the frame 20 as viewed in FIG. 7. For convenience sake, the portion of the strap 11 disposed above the frame 20 may then be cut as is diagrammatically illustrated by the arrows 52 in FIG. 7, and the portion of the strap 11 disposed thereabove and illustrated by dashed lines may be discarded.

From FIG. 7, it will be seen that a plurality of the teeth 35 are disposed opposite the end wall 27, whereby the portion of the strap 11 disposed therebetween is backed up by the end wall 27. As illustrated, four of the teeth 35 on the pawl 30 are thus disposed opposite the end wall 27, whereby it will be appreciated that the three full teeth 35 disposed within the strap-receiving opening 24 actually have the end wall 27 extending upwardly and downwardly with respect thereto, whereby these three engaged teeth are encompassed thereby. All of the teeth 35 in the tensioned condition are engaged and loaded, the teeth 35 having sequentially engaged successive ones of the teeth 15 on the strap 11 during the tensioning operation. The above described tensioning operation is made possible due to the fact that the pawl 30 terminates at points spaced from the end wall 27 in all positions of the pawl 30, i.e., a distance is preserved between the pawl 30 and the end wall 27 that is less than or no greater than the thickness of the strap 11 in all positions of the pawl 30. In the tensioned condition of FIG. 7, no part of the pawl 30 extends beyond the exit surface 28 of frame 20 and the portion of the strap 11 engaged between the pawl 30 and the end wall 27 has access thereof disposed parallel to the end wall 27 and normal to the entry surface 29, the end wall 27 being disposed normal to the entry surface 29.

The cable tie 10 is now firmly secured about the bundle 40 and cannot be readily removed therefrom. In fact, any force tending to withdraw the strap 11 from within the frame 20 in a strap-loosening direction only serves to move the teeth 35 on the pawl 30 into more firm engagement with the engaged ones of the teeth 15 on the strap 11. In other words, the pawl 30 serves firmly to wedge the strap 11 into firm locking engagement with the end wall 27 to prevent withdrawal of the strap 11 from the frame 20. As a consequence, the cable tie 20 is locked in its tensioned condition about the bundle 40 of the wires 41.

It is pointed out that with the parts in the locked positions of FIG. 7, the top surface 33 of the pawl 30 is essentially flush with the upper surface 28 of the frame 20. The surface of the pawl 30 carrying the teeth 35 is disposed essentially parallel to the end wall 27. As a result, a neat and unobstructed configuration is provided at the juncture between the strap 11 and the head 20, all while maintaining a firm grip upon the engaged portion of the strap 11 disposed within the frame 20.

In a constructional example of the cable tie 10, the overall length thereof is 7 inches; the width of the strap 11 is 0.195 inch; the width of the frame 20 is 0.312 inch; the width of the pawl 30 is 0.137 inch; the length of the thickened section 17 is 0.187 inch; the distance from the hinge section 31 to the end wall 27 is 0.203 inch; the distance from the end wall 27 to the outer end of the end member 25 is 0.093 inch; the distance between the surfaces 28 and 29 is 0.124 inch; the distance between the end wall 27 and the nearest portion of the pawl 30 as molded is 0.040 inch; the angle between a plane in which lies the crests of the teeth 35 and the surface 16 is 45°; the overall thickness of the strap 11, i.e., the distance from the surface 16 to the crests of the teeth 15, is 0.045 inch; the teeth 15 and the teeth 35 have a pitch of 0.030 and have the sides thereof disposed at 45° with respect to a plane defined by the outer crests thereof.

It is pointed out with particular reference to FIG. 7 that the planes defining the tooth surfaces 35a converage with the planes defining the pawl surfaces 33 and 34 at a point on the exit side of the frame 20. This configuration of these several surfaces permits the pawl 30 to be properly molded as one-piece with the remaining portions of the cable tie 10. The angle of convergence of the sets of planes noted may be quite small, and in fact may be essentially zero, i.e., the sets of planes might be essentially parallel, but there can be no substantial divergence therebetween.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An integral one-piece cable tie to be tensioned about a bundle of wires and the like, said cable tie comprising an elongated flexible strap, a frame integral with one end of said strap, said frame including a pair of longitudinally extending and spaced-apart side walls and an end wall joining the outer ends of said side walls and having a strap-receiving opening therethrough, a row of teeth disposed on one longitudinal surface of said strap and arranged transversely with respect thereto, a pawl hingedly mounted on and integral with said frame and extending into said strap-receiving opening toward said end wall, said end wall having a strap-bearing surface disposed toward said pawl and said pawl having a strap-engaging surface disposed toward said end wall and defining therewith a strap-receiving channel, and a set of teeth disposed on said strap-engaging surface of said pawl and arranged transversely with respect thereto and shaped complementary to said row of teeth on said strap, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, said set of teeth upon release of said tensioned strap sequentially moving into firm engagement with and remaining in firm engagement with successive adjacent ones of said row of teeth, any force tending to withdraw said strap from within said strap-receiving channel in a strap-loosening direction serving to move said set of teeth into more firm engagement with the engaged ones of said row of teeth firmly to wedge said strap between said strap-bearing surface and said strap-engaging surface, whereby to prevent inadvertent withdrawal of said strap from said frame and thus to lock said strap in its tensioned condition about the bundle of wires.

2. The integral one-piece cable tie set forth in claim 1, wherein said frame has a thickness substantially greater than said strap.

3. The integral one-piece cable tie set forth in claim 1, wherein said one surface of said strap and the adjacent surface of said frame are in substantial alignment, and said frame extends well beyond the other surface of said strap.

4. The integral one-piece cable tie set forth in claim 1, wherein an area of reduced thickness of the same order as said strap is provided between said frame and said pawl to define a hinge area therebetween.

5. The integral one-piece cable tie set forth in claim 1, wherein said pawl as molded extends well beyond the surface of said frame disposed opposite said row of teeth.

6. The integral one-piece cable tie set forth in claim 1, wherein the portion of said frame disposed between said pawl and said strap has a thickness of the same order of magnitude as said strap, whereby to permit unrestricted bending movement of said pawl away from said strap bearing surface.

7. The integral one-piece cable tie set forth in claim 1, wherein said strap-bearing surface and said strap-engaging surface are disposed essentially in parallelism when said set of teeth is in locking engagement with the associated ones of said row of teeth.

8. An integral one-piece cable tie to be tensioned about a bundle of wires and the like, said cable tie comprising, an elongated flexible strap, a frame integral with one end of said strap, said frame including a pair of longitudinally extending and spaced-apart side walls on said one end of said strap and an end wall joining the outer ends of said side walls, said one end of said strap and said side walls and said end wall defining a strap-receiving opening, a row of teeth disposed on one longitudinal surface of said strap and arranged transversely with respect tthereto, a pawl hingedly mounted on and integral with said one end of said strap and extending into said strap-receiving opening toward said end wall, said end wall having a strap-bearing surface disposed toward said pawl and said pawl having a strap-engaging surface disposed toward said one end wall and defining therewith a strap-receiving channel, and a set of teeth disposed on said strap-engaging surface of said pawl and arranged transversely with respect thereto and shaped complementary to said row of teeth on said strap, said strap being deformable into a loop encircling a bundle of wires with the other end of said strap extending into said strap-receiving channel and through said opening and beyond said frame, said pawl being pivotal away from said strap-bearing surface to accommodate the threading of said other strap end into and through said strap-receiving channel, said set of teeth being disposed toward said row of teeth as said strap is tightened about the bundle of wires to a tensioned condition, said set of teeth upon release of said tensioned strap sequentially moving into firm engagement with and remaining in firm engagement with successive adjacent ones of said row of teeth, any force tending to withdraw said strap from within said strap-receiving channel in a strap loosening direction serving to move said set of teeth into more firm engagement with the engaged ones of said row of teeth firmly to wedge said strap between said strap-bearing surface and said strap-engaging surface, whereby to prevent inadvertent withdrawal of said strap from said frame and thus to lock said strap in its tensioned condition about the bundle of wires.

9. The integral one-piece cable tie set forth in claim 8, wherein said strap-bearing surface is disposed substantially normal to the as-molded longitudinal axis of said strap.

10. An integral one-piece cable tie to be tensioned about a bundle of wires and the like, said cable tie comprising an elongated flexible strap, a frame integral with one end of said strap and including an abutment wall, said frame having an entry surface and an exit surface and a strap-receiving opening extending therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row of teeth on said strap, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, a plurality of teeth in said set of teeth being positioned opposite said strap-bearing surface in the tensioned condition of said strap with said strap-bearing surface extending beyond said plurality of teeth toward both said entry surface and said exit surface thereby to encompass said plurality of teeth, any force tending to withdraw said strap from within said strap-receiving channel in a strap-loosening direction serving to move said set of teeth including said plurality of teeth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundle of wires.

11. The integral one-piece cable tie set forth in claim 10, wherein said plurality of teeth in said set of teeth consists of two teeth.

12. The integral one-piece cable tie set forth in claim 10, wherein said plurality of teeth in said set of teeth consists of three teeth.

13. The integral one-piece cable tie set forth in claim 10, wherein said plurality of teeth in said set of teeth consists of more than three teeth.

14. The integral one-piece cable tie set forth in claim 10, wherein said row of teeth is disposed on the surface of said strap that is disposed against the bundle of wires in use.

15. An integral one-piece cable tie to be tensioned about a bundle of wires and the like, said cable tie comprising an elongated flexible strap, a frame integral with one end of said strap and including an abutment wall, said frame having an entry surface and exit surface and a strap-receiving opening extending therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row of teeth on said strap, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, the planes defined by the surfaces of said set of teeth disposed toward said entry surface in the tensioned condition converging with the planes defined by the surfaces of said pawl disposed toward said exit surface and away from said abutment wall in the tensioned condition at points disposed on the exit side of said frame at angles as small as zero degrees, any force tending to withdraw said strap from within said strap-receiving channel in a strap-loosening direction serving to move said set of teeth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundles of wires.

16. An integral one-piece cable tie to be tensioned about a bundle of wires and the like, said cable tie comprising an elongated flexible strap, a frame integral with one end of said strap and including an abutment wall, said frame having an entry surface and an exit surface and a strap-receiving opening extending therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped completmentary to said row of teeth on said strap, the crests of a plurality of the teeth in said set of teeth lying in a common surface spaced equidistantly from said strap-bearing surface in the tensioned condition, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, a plurality of teeth in said set of teeth being positioned opposite said strap-bearing surface in the tensioned condition of said strap with said strap-bearing surface extending beyond said plurality of teeth thereby to encompass said plurality of teeth, the planes defined by the surfaces of said set of teeth disposed toward said entry surface in the tensioned condition converging with the planes defined by the surfaces of said pawl disposed toward said exit surface and away from said abutment wall in the tensioned condition at points disposed on the exit side of said frame at angles as small as zero degrees, any force tending to withdraw said strap from within said strap-receiving channel in a strap-loosening direction serving to move said set of teeth including said plurality of teeth into more firm engagement with the engaged ones of said row of teeth firmly to wedge said strap between said strap-bearing surface and said pawl, whereby to prevent inadvertent withdrawal of said strap and said frame and thus to lock said strap in its tensioned condition about the bundle of wires.

17. An integral one-piece cable tie to be tensioned about a bundle of wires and the like, said cable tie comprising an elongated flexible strap, a frame integral with one end of said strap and including an abutment wall, said frame having an entry surface and an exit surface and a strap-receiving opening extending therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row of teeth on said strap, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, no part of said pawl in the tensioned condition extending beyond the exit surface of said frame, any force tending to withdraw said strap from within said strap-receiving channel in a strap-loosening direction serving to move said set of teeth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundle of wires.

18. An integral one-piece cable tie to be tensioned about a bundle of wires and the like, said cable tie comprising an elongated flexible strap, a frame integral with one end of said strap and including an abutment wall and having a strap-receiving opening therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row disposed on one longitudinal surface of said strap and arof teeth on said strap, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, all of the teeth in said set of teeth being engaged and loaded in the tensioned condition of said strap, any force tending to withdraw said strap from within said strap-receiving channel in a strap-loosening direction serving to move said set of teeth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundle of wires.

19. An integral one-piece cable tie to be tensioned about a bundle of wires and the like, said cable tie comprising an elongated flexible strap, a frame integral with one end of said strap and including an abutment wall and having a strap-receiving opening therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row of teeth on said strap, the crests of the teeth in said set of teeth all lying in a common plane, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, any force tending to withdraw said strap from within said strap-receiving channel in a strap-loosening direction serving to move said set of teeth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundle of wires.

20. The integral one-piece cable tie set forth in claim 19, wherein the plane containing the crests of the teeth in said set of teeth is substantially parallel to said strap-bearing surface when said strap is in the tensioned condition thereof.

21. An integral one-piece cable tie to be tensioned about a bundle of wires and the like, said cable tie comprising an elongated flexible strap, a frame integral with one end of said strap and including an abutment wall, said frame having an entry surface and an exit surface and a strap-receiving opening extending therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row of teeth on said strap, the crests of the teeth in said set of teeth all lying in a common plane, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, a plurality of teeth in said set of teeth being positioned opposite said strap-bearing surface in the tensioned condition of said strap with said strap-bearing surface extending beyond said plurality of teeth thereby to encompass said plurality of teeth, any force tending to withdraw said strap from within said strap-receiving channel in a strap-loosening direction serving to move said set of teeth including said plurality of teeth into more firm engagement with the engaged ones of said row of teeth firmly to wedge said strap between said strap-bearing surface and said pawl, whereby to prevent inadvertent withdrawal of said strap from said frame and thus lock said strap in its tensioned condition about the bundle of wires.

22. An integral one-piece cable tie to be tensioned about a bundle of wires and the like, said cable tie comprising an elongated flexible strap, a frame integral with one of said strap and including an abutment wall and having a strap-receiving opening therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row of teeth on said strap, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, said frame being spaced from the surfaces of said pawl disposed away from said strap-bearing surface to accommodate maximum flexure of said pawl away from said strap-bearing surface during insertion of said strap into said strap-receiving opening, any force tending to withdraw said strap from within said strap-receiving channel in a strap-loosening direction serving to move said set of teeth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundle of wires.

23. An integral one-piece cable tie to be tensioned about a bundle of wires and the like, said cable tie comprising an elongated flexible strap, a frame integral with one end of said strap and including an abutment wall and having a strap receiving opening therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row of teeth on said strap, the crests of the teeth in said set of teeth all lying in a common plane, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, said pawl having a normal disengaged position wherein said plane is disposed at an acute angle to said strap-bearing surface, said pawl having an engaged position wherein said plane is disposed substantially parallel to said strap-bearing surface when said strap is in the tensioned condition thereof, any force tending to withdraw said strap from within said strap-receiving channel in a strap-loosening direction serving to move said set of teeth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundle of wires.

24. An integral one-piece cable tie to be tensioned about a bundle of wires and the like, said cable tie comprising an elongated flexible strap, a frame integral with one end of said strap and including an abutment wall, said frame having an entry surface and an exit surface and a strap-receiving opening extending therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a set of teeth on said pawl arranged transversely with respect thereto and disposed toward said abutment wall and shaped complementary to said row of teeth on said strap, the crests of a plurality of the teeth in said set of teeth lying in a common surface space equidistantly from said strap-bearing surface in the tensioned condition, said strap being deformable into a loop encircling a bundle of wires with the other end of said strap extending into said strap-receiving channel and through the opening in said frame and therebeyond, said set of teeth being disposed toward said row of teeth as said strap is tightened about the bundle of wires to a tensioned condition, said set of teeth upon release of said tensioned strap moving into firm engagement with adjacent ones of said row of teeth, any force tending to withdraw said strap from within said strap-receiving channel in a strap-loosening direction serving to move said set of teeth including said plurality of teeth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundel of wires.

25. An integral one-piece cable tie to be tensioned about a bundle of wires and the like, said cable tie comprising an elongated flexible strap, a frame integral with one end of said strap and including an abutment wall, said frame having an entry surface and an exit surface and a strap-receiving opening extending therethrough, a row of engagement members disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a tooth on said pawl arranged transversely with respect thereto and disposed toward said abutment wall, said strap being deformable into a loop encircling a bundle of wires with the other end of said strap extending into said trap-receiving channel and through the opening in said frame and therebeyond, said tooth being disposed toward said row of engagement members as said strap is tightened about the bundle of wires to a tensioned condition, said tooth in the final tensioned condition being disposed opposite the strap-bearing surface only and engaging said strap opposite said strap-bearing surface only, said strap-bearing surface extending beyond said tooth toward both the entry and exit surfaces, any force tending to withdraw said strap from within said strap-receiving channel in a strap-loosening direction serving to move said tooth into more firm engagement, whereby to prevent inadvertent withdrawal of said strap from said frame and thus to lock said strap in its tensioned condition about the bundle of wires.

26. An integral one-piece cable tie to be tensioned about a bundle of wires and the like, said cable tie comprising an elongated flexible strap, a frame integral with one end of said strap and including an abutment wall, said frame having an entry surface and an exit surface and a strap-receiving opening extending therethrough, a row of teeth disposed on one longitudinal surface of said strap and arranged transversely with respect thereto, a pawl hingedly mounted on and integral with said frame and extending into said strap-receiving opening toward said abutment wall, said abutment wall having a strap-bearing surface disposed toward said pawl and defining therewith a strap-receiving channel, and a tooth on said pawl arranged transversely with respect thereto and disposed toward said abutment wall and shaped complementary to said row of teeth on said strap, said strap being deformable into a loop encircling a bundle of wires with the other end of said strap extending into said strap-receiving channel and through the opening in said frame and therebeyond, said tooth being disposed toward said row of teeth as said strap is tightened about the bundle of wires to a tensioned condition, said tooth in the final tensioned condition being disposed opposite the strap-bearing surface only and wedging the engaged portion of said strap against said strap-bearing surface only, any force tending to withdraw said strap from within said strap-receiving channel in a strap-loosening direction serving to move said tooth into more firm engagement with the engaged ones of said row of teeth firmly to wedge said strap between said strap-bearing surface and said pawl, whereby to prevent inadvertent withdrawal of said strap from said frame and thus to lock said strap in its tensioned condition about the bundle of wires.

27. The integral one-piece cable tie set forth in claim 26, wherein said strap-bearing surface extends beyond said tooth toward both the entry and exist srufaces.

References Cited
UNITED STATES PATENTS

| | | |
|---|---|---|
| 3,127,648 | 4/1964 | Emery. |
| 3,149,808 | 9/1964 | Weckesser. |
| 3,368,247 | 2/1968 | Orban. |

DONALD A. GRIFFIN, Primary Examiner

UNITED STATES PATENT OFFICE
CERTIFICATE OF CORRECTION

Patent No. 3,537,146          Dated November 3, 1970

Inventor(s) J. E. Caveney

It is certified that error appears in the above-identified patent and that said Letters Patent are hereby corrected as shown below:

Column 3, line 35 "of", second occurrence, should be --or--.

Column 3, line 50, "tended" should be -- tend --.

Column 6, line 17, "converage" should be -- converge --.

Column 7, claim 4, line 4, delete "of the same order as said strap".

Column 7, claim 8, line 31, after "respect" delete "t" before "thereto".

Column 9, claim 16, line 16 "pletmentary" should be -- plementary --.

Column 10, claim 18, line 16, delete the entire line.

Column 11, claim 22, line 32, after "one" insert -- end --.

Column 12, claim 24, line 57, "bundel" should be -- bundle --

Column 13, claim 25, line 1, "trap" should be -- strap --.

Column 14, claim 27, line 21, "srufaces" should be --surfaces

Column 8, claim 15, line 44, the word "an" should be inserted after "and" and before "exit".

Column 14, claim 27, line 21, "exist" should be -- exit --.

Signed and sealed this 19th day of January 1971.

(SEAL)
Attest:

EDWARD M. FLETCHER, JR.
Attesting Officer

WILLIAM E. SCHUYLER, JR.
Commissioner of Patents